Jan. 12, 1971     C. C. ELLEFSON     3,553,960
PIN KNOCKOUT DEVICE FOR ROLLER CHAINS
Filed Sept. 19, 1968     3 Sheets-Sheet 1
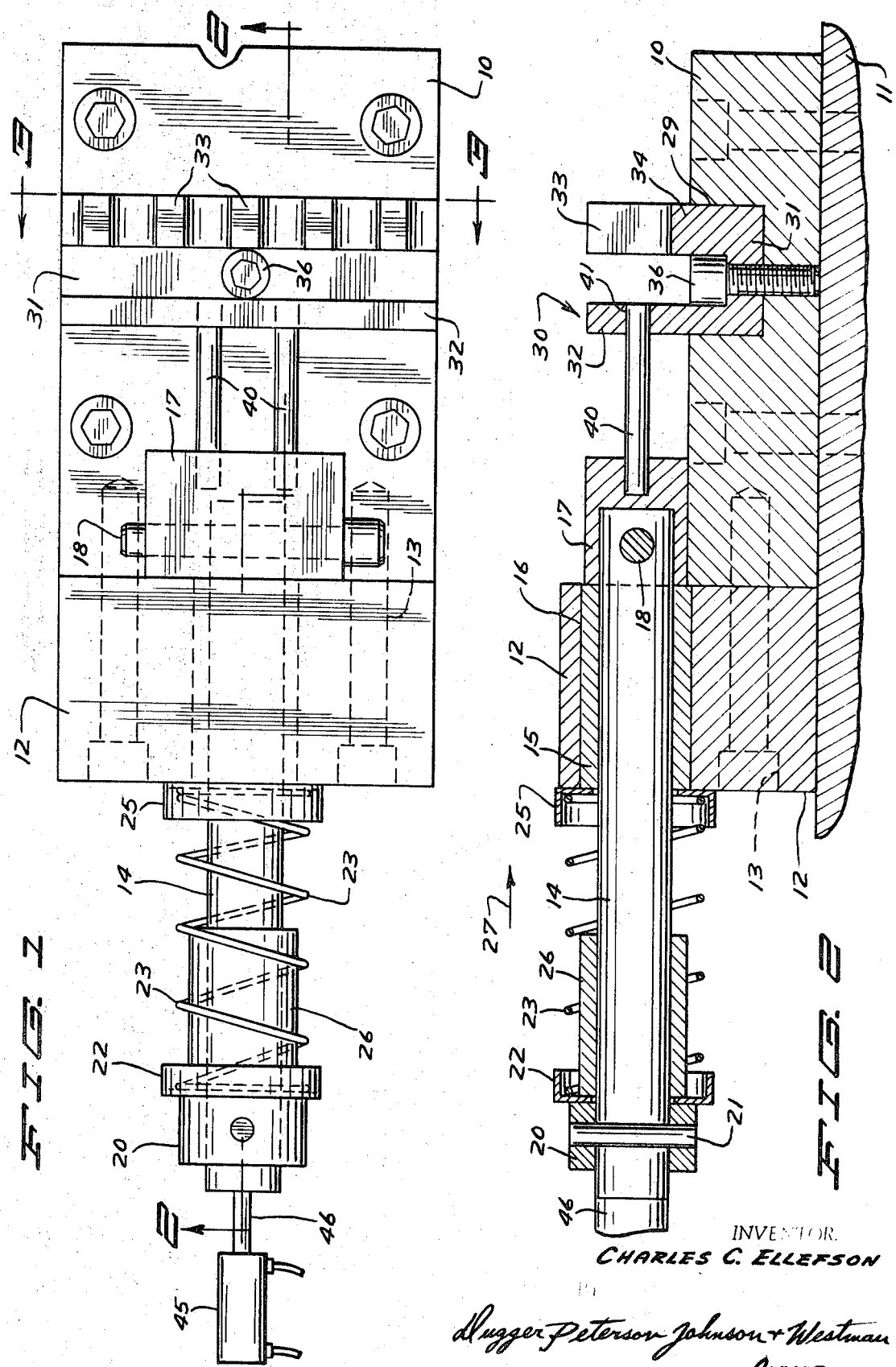
INVENTOR.
CHARLES C. ELLEFSON
Dugger, Peterson, Johnson + Westman
ATTORNEYS INVENTOR.
CHARLES C. ELLEFSON
BY
Dugger Peterson Johnson & Westman
ATTORNEYS Jan. 12, 1971  C. C. ELLEFSON  3,553,960
PIN KNOCKOUT DEVICE FOR ROLLER CHAINS
Filed Sept. 19, 1968  3 Sheets-Sheet 3
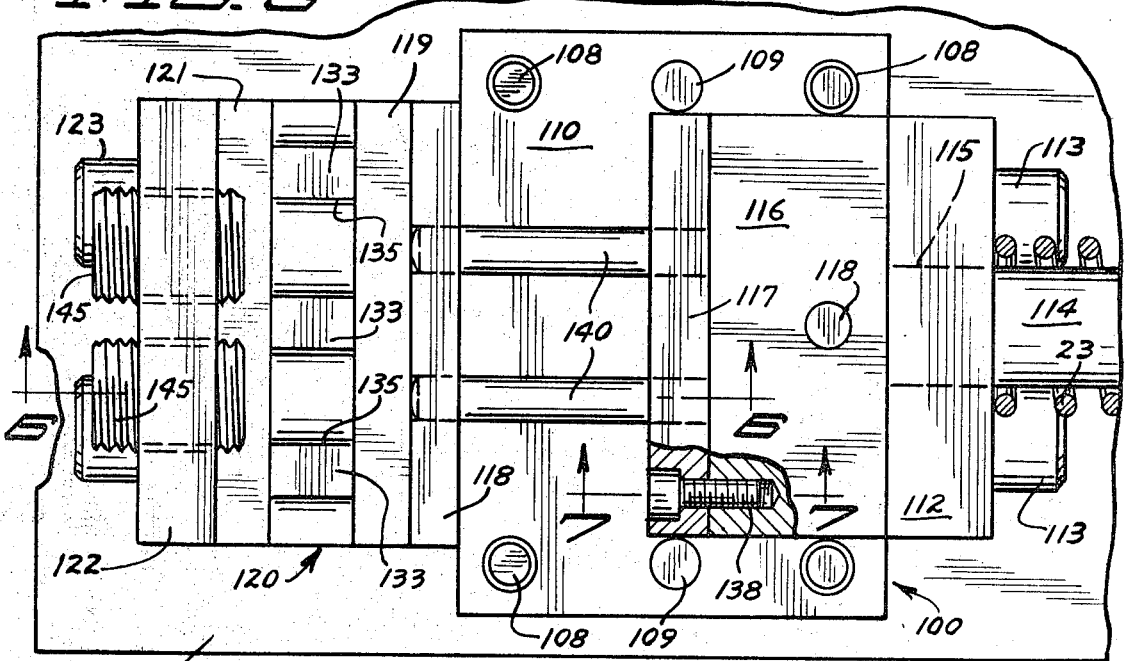
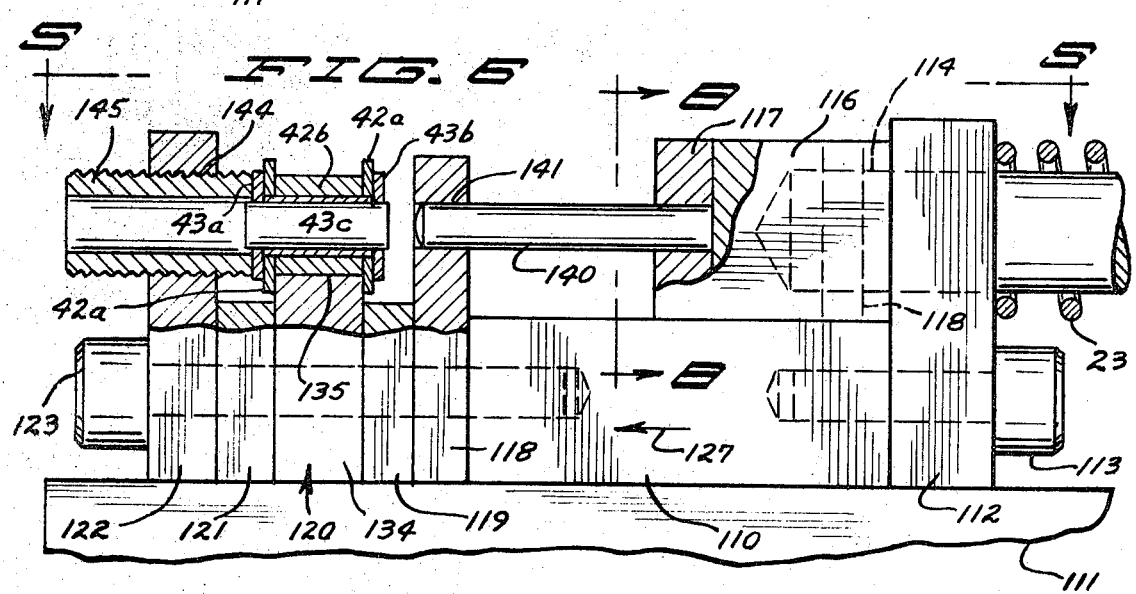
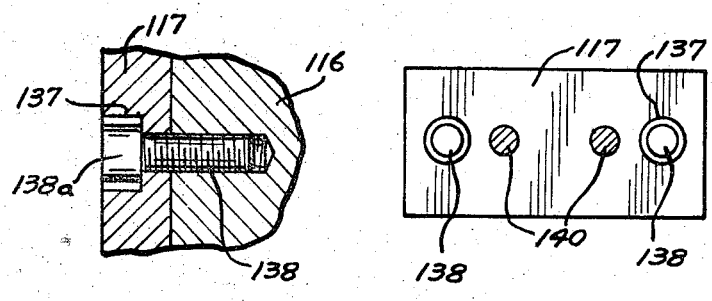
INVENTOR.
CHARLES C. ELLEFSON
BY
Dugger Peterson Johnson & Westman
ATTORNEYS

United States Patent Office 3,553,960
Patented Jan. 12, 1971

3,553,960
PIN KNOCKOUT DEVICE FOR ROLLER CHAINS
Charles C. Ellefson, Fridley, Minn.
(3632 Lincoln St. NE., Minneapolis, Minn. 55418)
Continuation-in-part of application Ser. No. 608,006, Jan. 9, 1967. This application Sept. 19, 1968, Ser. No. 772,444
Int. Cl. B21l 21/00
U.S. Cl. 59—7                                    12 Claims

ABSTRACT OF THE DISCLOSURE

A pin knockout device having simultaneously operated plungers that force the pins of one link of a roller chain out of the bushings together with separating one plate from the pins while the remainder of the roller chain is being retained in a fixed position. The disclosure is directed to simultaneously pushing out the pins of one link of a roller chain in order to at least partially disassemble a roller chain.

CROSS REFERENCE TO RELATED APPLICATIONS

This application is a continuation-in-part of my application Ser. No. 608,006, now abandoned filed Jan. 9, 1967 and bearing the same title as this application.

BACKGROUND OF THE INVENTION

This invention relates to a method and apparatus for disassembling the connecting links of a roller chain. In the apparatus of U.S. Pat. No. 3,075,347 there is disclosed a device for pushing out only a single pin at one time of a crawler type tractor chain. However, this apparatus is not satisfactory for removing pins of a roller chain, nor is it nearly as readily usable for roller chains of different sizes as the apparatus of this invention.

SUMMARY OF THE INVENTION

The pin knockout device has a pair of simultaneously operated plungers that force the two pins of a connecting link out of the adjacent bushings of the adjacent pair of roller links which are being retained in a given position by abutment projections that extend upwardly between the bushings and the plates of two adjacent roller links; while the method is directed to simultaneously pushing the pair of pins of one connecting link out of the pin plate of the respective connecting link in order to at least partially disassemble the roller chain.

BRIEF DESCRIPTION OF THE DRAWINGS

FIG. 1 is a plan view of the apparatus of the first embodiment of this invention, a piston cylinder combination for operating said apparatus being shown in schematic;

FIG. 2 is a horizontal cross-sectional view generally taken along the line and in the direction of arrows 2—2 of FIG. 1;

Figure 3:
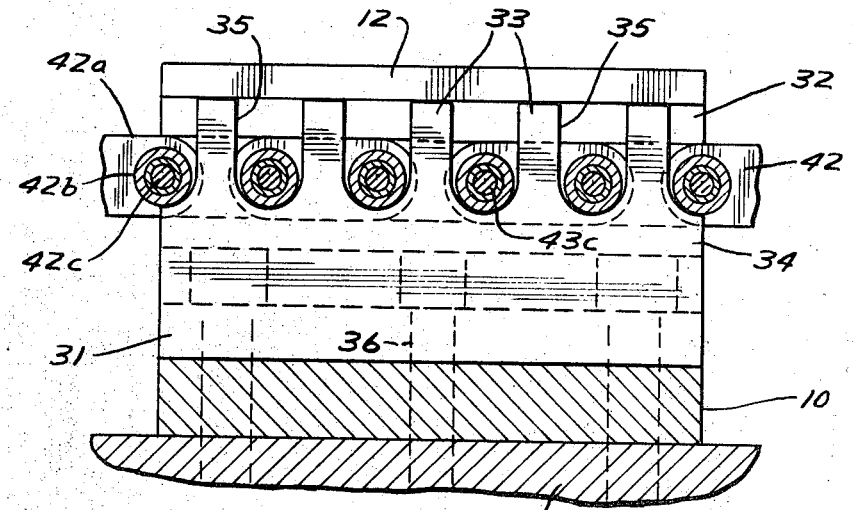
FIG. 3 is a transverse cross-sectional view generally taken along the line and in the direction of arrows 3—3 of FIG. 1.
Figure 4:
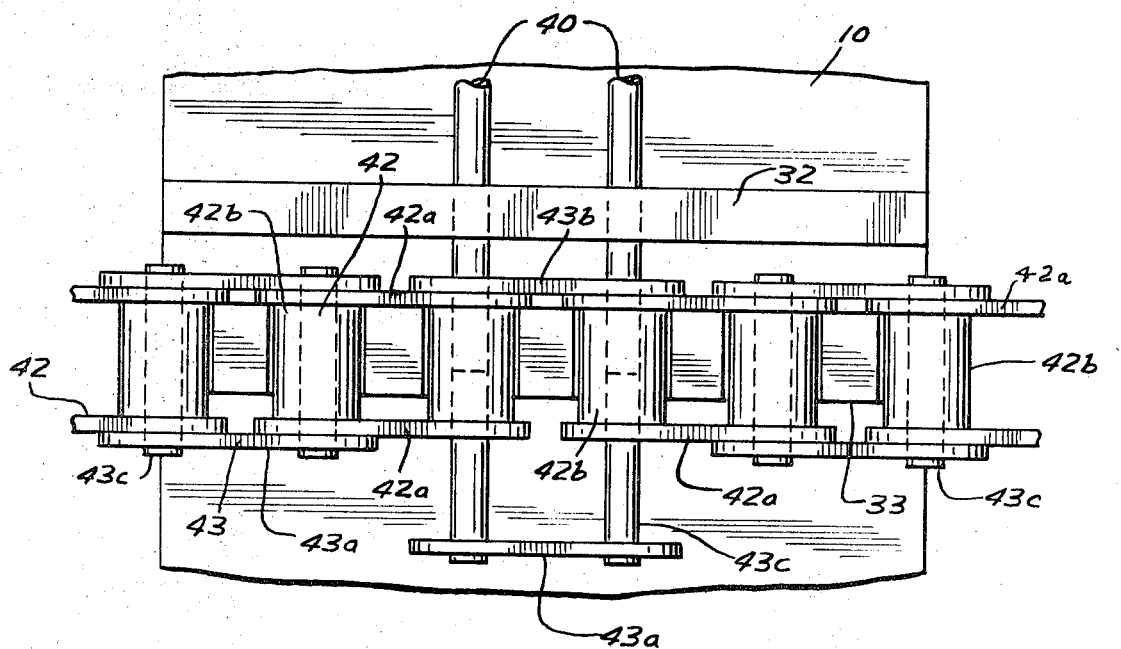
FIG. 4 is an enlarged fragmentary plan view of the first embodiment illustrating the two pins and one pin plate of the connecting link being forced longitudinally away from the remainder of the roller chain.

FG. 5 is a fragmentary plan view of the apparatus of the second embodiment of the invention, said view being generally taken along the line and in the direction of the arrows 5—5 of FIG. 6;

FIG. 6 is in part a fragmentary side view of the apparatus of this invention, and in part a cross-sectional view generally taken along the line and in the direction of arrows 6—6 of FIG. 5;

FIG. 7 is a fragmentary cross-sectional view generally taken along the line and in the direction of arrows 7—7 of FIG. 5; and FIG. 8 is a view generally taken along the line and in the direction of the arrows 8—8 of FIG. 6 to show the feature of being able to adjustably position the plungers.

DESCRIPTION OF THE PREFERRED EMBODIMENT

Referring now in particular to FIGS. 1 and 2, the first embodiment of the device of this invention includes a frame 10 which advantageously may be in the form of a rectangular block bolted to a supporting member 11, such as a table. At one longitudinal end of the frame a ram block 12 is secured to the frame by bolts 13, block 12 being of a substantially greater height than frame 10. Block 12 has a longitudinally extending bore 16 opening through either end thereof at an elevation above frame 10 and that is transversely centered. Retained in the bore 16 is a bushing 15, a ramrod 14 being slidably extended through the bushing.

One end of ramrod 14 is extended into an aperture of the plunger block 17 and is bolted thereto by a rod 18. In the retracted condition of the ramrod, the plunger block abuts against one vertical edge of block 12, the plunger block being slidably movable over the upper surface of the frame 10.

On the end portion of the ramrod opposite the plunger block there is provided an annular member 20 that is secured to the ramrod by a pin 21. A cupped washer 22 is provided on the ramrod in abutting relationship with annular member 20, one end of a coil spring 23 being seated in said cupped washer and the opposite end of said spring being seated in the cupped washer 25 that is provided on the ramrod. The coil spring accordingly forces the cupped washer 25 against the vertical edge of the ram block that is opposite plunger block 17 and the cupped washer 22 against annular member 20 to resiliently retain the ramrod in the retracted position of FIG. 2. Provided on the ramrod is an axially elongated, annular stop member 26 that abuts against washer 22, stop member 26 limiting the movement of the ramrod in the direction of the arrow 27.

Longitudinally spaced from the block 12, the frame 10 is provided with a transversely elongated slot 29 in which there is removably mounted an abutment (cradle), generally designated 30. The frame has parallel vertical surfaces and a horizontal surface defining said slot. The abutment has a web portion 31 that abuts against the bottom of the slot, a leg 32 extending above web portion 31 and integrally joined thereto, and a plurality of upwardly extending, transversely aligned projections 33 (at least three) that at the lower ends are joined to a second leg 34 which in turn is integrally joined to web portion 31. As may be noted from FIG. 2, the combination of projections 33 and leg 34 are substantially longitudinally spaced from leg 32, leg 32 and projections 33 extending to a substantial elevation above the upper surface of frame 10. Further each adjacent pair of projections provide a notch that is generally U-shaped in transverse cross-section, the lowermost surface of each notch 35 being at a slightly higher elevation than the upper surface of frame 10. The abutment 30 is removably secured in the slot 29 by a bolt 36 extended through web portion 31 and threaded into the frame.

Fixedly secured in the plunger block 17 are the one end portions of a pair of plungers 40 that are mounted in transversely spaced, parallel relationship, plungers 40 extending into guide apertures 41 provided in leg 32. Apertures 41 form a close fit with plungers 40 to prevent misalignment of the plungers as they are moved therethrough as will be mentioned hereinafter. As may be noted from FIG. 1, each plunger 40 is transversely located to, upon the ramrod 14 being moved horizontally in the direction of arrow 27, move into and through a notch 35. Further each plunger is located at a higher elevation than the lower most surface portions of the notches 35, the plungers being movable into adjacent notches. Additionally the end portions of the plungers opposite the plunger block are of substantially the same diameters.

In order to operate the ramrod in the direction of arrow 27 there is provided a two-way acting piston cylinder combination having a cylinder 45 that advantageously is bolted to support member 11 and a piston rod 46 that in a retracted condition is adjacent the end of the ramrod on which annular member 20 is located.

Before describing the use of the apparatus of this invention, a brief description of the roller chain will be set forth. The roller chain is comprised of a plurality of roller links 42 and connecting links 43, each adjacent pair of roller links being connected together by a connecting link. Each roller link includes a pair of spaced roller plates 42a that are retained in spaced relationship by a pair of rollers 42b that extend between the roller plates 42a. In each roller there is a bushing 42c that extends through the adjacent aperture of the roller plate. Each connecting link includes a pair of spaced pin plates 43a, 43b respectively and a pair of pins 43c. In the roller chain assembled condition each pin 43c has one end portion that is press fitted in the respective pin plate aperture of one pin plate 43a, the opposite ends of the pins being press fitted in the apertures of pin plate 43b. One pin is pivotally extended through the bushing of one roller link while the other pin is extended through the bushing of a second roller link, the end portions of the roller plates of two roller links being located transversely between the adjacent end portions of the pin plates of one connecting link. In a chain assembled condition, the bushings terminate in substantial abutting condition with the inner surfaces of the pin plates.

When it is desired to disassemble a roller chain, links of the roller chain are positioned such that the rollers rest in the notches 35 with the two pins of the one pin link to be disassembled longitudinally opposite plungers 40. In this position the projections 33 are located between the rollers and the plates of the roller chain to cradle a portion of the chain. Each notch has a lower portion of a radius of curvature slightly greater than the outer radius of curvature of a roller to provide a relatively close fit with the lower half section of the roller while the remainder of the surfaces of the projections defining said notch extend generally vertically. The transverse width of the upper portion of each projection is slightly less than the spacing of adjacent rollers, and is greater than the spacing of the adjacent end portions of the plates of the two adjacent roller links that are connected together by one connecting link. As a result, in positioning the chain or chain portion on the abutment, the chain may be flexed downwardly into abutting relationship with the notch lower portions, the notch lower portions supporting the rollers such that the lowermost edge portions of the plates of the part of the chain to be disassembled are closely adjacent the upper surface of frame 10.

Upon applying air under pressure to the piston cylinder combination 45, 46 to move the piston rod in the direction of arrow 27, the piston rod forces the ramrod against the resilient action of spring 23 in the same direction. This results in the plunger block 17 and the plungers 40 also being moved in the same direction. The plungers are moved into abutting relationship with the adjacent ends of the pins 43c, and if the plates 42a are not abutting against the vertical transverse surfaces of the projections 33, the chain is moved in the same direction until such occurs. As may be noted, the center projection abuts against the adjacent end portions of two adjacent plates of the two roller links connected by the connecting link while the central portion of each of said two roller plates abuts against the projection adjacent to and on the respective transverse side of said center projection. Thereafter, the roller plates 42a and pin plate 43b are not moved further in the direction of arrow 27. As a result of the continued movement of the plungers, the plungers move into the apertures of the adjacent plate 43b to force the pins 43c outwardly through their respective bushings. Since the remote plate 43a is press fitted on pins 43c, plate 43a also moves with the pins.

After the plungers 40 have been moved to completely disengage the pins from their respective bushings, the stop 26 comes into abutting relationship with the washer 25 and the piston cylinder combination is at the end of its stroke. Thereafter air is applied to the opposite end of the cylinder to retract the piston rod, and then the spring 23 moves the ramrod in the direction opposite arrow 27 to return said rod to the position of FIG. 2. In this connection it is to be noted that the diameter of each of plungers 40 is sufficiently less than the internal diameters of the bushings of the roller chain that the movement of the plungers through the bushings does not retard the retracting movement of the ramrod.

After the disassembled plate 43a and pins 43c and plate 43b are removed, the other separate portions of the chain are lifted from the abutment and another assembled connecting link is positioned to have its pins longitudinally opposite the plungers 40. The previously described steps may be repeated until all of the roller links are completely separated from the connecting links, provided such is desired.

It is to be mentioned if the apparatus of this invention is to be used with a roller chain of a different size, then bolts 18 and 36 may be removed to disassemble the plunger block 17 and the abutment 30 and an appropriate size plunger block and abutment 30 are connected to the ram and frame respectively. If different abutments are provided, the longitudinal width of the web portion 31 would be great enough to fill the lower portion slot 29, however, the transverse spacing of the projections 33, and longitudinal spacing of legs 32 and the projections 33 be appropriately varied for the roller chain to be disassembled.

Referring now in particular to FIGS. 5–7, the second embodiment of the device of this invention, generally designated 100, includes a frame 110 that has vertical alignment pins 109 that extend up through spaced apertures in said frame, the alignment pins being secured to a support member 111. Further, the frame is bolted to member 111 by a plurality of bolts 108. At one end of the frame, a ram block 112 is secured thereto by bolts 113, block 112 being of substantially greater heighth than frame 110. Block 112 has a longitudinally extending, transversely centered bore 115 opening through either end thereof at an elevation above the frame.

One end of the ramrod 114 is slidably extended through the block bore 115 and extended into the plunger block 116 of plunger member 116, 117 and secured to the plunger block by a pin 118. In the retracted condition of the ramrod, the plunger block abuts against one vertical surface of block 112, the plunger block being slidably movable over the upper surface of frame 110. The end portion of the ramrod opposite the plunger block has an annular member 20 secured thereto by a pin, an annular stop 26, a cup washer 22 abutting against annular member 20 and a coil spring 23 having one end seated in said cup washer (members 20–22 and 26 not being shown since they are mounted on the ramrod 114 in the same manner as indicated relative ramrod 14 in FIG. 1). The opposite end of coil spring 23 abuts against block 112. Mounted in abutting relationship with the frame at the end opposite block 112 is a pin guide plate 118, a spacer plate 119 being mounted intermediate the cradle or abutment, generally designated 120, and spacer plate 121. A backup plate 122 is mounted in abutting relationship with the end surface of plate 121 that is opposite the abutment. Members 118–122 are secured to the frame 110 by a pair of longitudinally elongated bolts 123 that are extended therethrough and threaded into said frame. As may be noted from FIG. 6, the spacer plates 119, 121 extend to a slightly higher elevation than the top surface of frame 110 while the pin guide plate, the abutment and the backup plate each extend to a substantially higher elevation than the top surface of the frame. To be mentioned is that members 119–121 may be integrally formed.

The abutment has a plurality of upwardly extending, transversely aligned projections 133 (at least three) that at their lower ends are integrally joined to the body portion 134. Each adjacent pair of projections provide a notch 135 that is generally U-shaped in transverse cross-section, the lowermost surface of each notch 135 being at a slightly higher elevation than the upper surface of frame 110.

Fixedly secured, for example, press fitted in the plunger end plate 117 are the one end portions of a pair of elongated plungers 140 that are mounted in transverse spaced, parallel relationship, the plungers extending into the guide apertures 141 provided in the guide plate 118 to prevent misalignment of the plungers as they are moved therethrough. Each plunger is transversely located to, upon the ramrod 114 being moved horizontally in the direction of the arrow 127, move into and through a notch 135. Further each plunger is located at a higher elevation than the lowermost surface portion of the notch 135 that is longitudinally aligned therewith, while the end portions of the plungers opposite the plunger end plate are of substantially the same diameters.

The end plate 117 is secured to the plunger block 116 by a pair of socket head cap screws 138, each bore in the end plate through which a cap screw 138 is extended having an enlarged diametric portion 137 that is of a substantially larger diameter than the corresponding dimension of the head end 138a of the cap screw to provide an adjustment feature that will be described hereinafter. To be noted is that the axis of elongation of each cap screw is parallel to the direction of elongation of the plungers 140.

The backup plate has a pair of transversely spaced, internally threaded apertures 144, each aperture having a central axis coextensive the extension of longitudinal center axis of one of the plungers 140. An externally threaded sleeve 145 of a substantially greater axial length than the thickness dimension of the backup plate is threaded into each aperture 144. The internal diameter of the sleeve is slightly greater than the pin 43c that is to be removed from the roller chain being worked on while the diameter of each plunger 140 is slightly smaller than the diameter of a pin 43c.

With the socket head screws 138 loosely threaded into the plunger block, and the cap bolts 123 extended through members 118–122 and loosely threaded into frame 110, the plungers 140 are moved in the direction of the arrow 127 to extend through apertures 141 and into sleeves 145. Now the cap bolts 123 are tightened. Thereafter, if necessary, the end plate 117 is moved relative to the plunger block 116 so that the plungers are centrally located relative to the respective sleeve and the notches 135 of the abutment 120, i.e. the central longitudinal axis of a plunger aligned with the central axis of the pin 43c of a chain portion supported in the abutment in a position for disassembly. This adjustable movement is possible since the diameter of bore portions 137 is substantially larger than the corresponding dimension of the head ends of the cap screws 138. Thence the cap screws 138 are further threaded into the plunger block to retain the end plate in a fixed position relative to the plunger block.

Now with the sleeves 145 extending a short distance toward the notches 135 and the plungers retracted, a roller chain is positioned such that the rollers rest in the notches 135 with the two pins 43c of the one pin link to be disassembled longitudinally opposite the plungers. Then the sleeves are further threaded into apertures 144 to abut against the pin plates 43a. Now the piston cylinder combination for the ramrod 114 is actuated to move the ramrod, the plunger member 116, 117 and the plungers 140 in the direction of the arrow 127 into abutting relationship with the adjacent ends of pins 43c; and thence to force said pins through the rollers 42b into the respective sleeve. As a result, both pin plates 43a, 43b and the two pins 43c are disconnected from the chain.

If the second embodiment of this invention is to be used with roller chains of different sizes, then members 118–123 may be removed from frame 110 and the appropriate sized corresponding members be assembled together with the appropriate size sleeves for the different size chains. Also, if necessary, an end plate having different size plungers may be used in place of the corresponding members presently secured to block 116.

What I claim is:

1. For disassembling a roller chain having alternating roller links and connecting links, each roller link having a pair of roller plates, a pair of rollers between said roller plates, and a bushing in each roller, and each connecting link having a pair of pins and pin plates press fitted on opposite end portions of said pins, said pins respectively being extended through the bushings of adjacent roller links and the roller plates of adjacent roller links extending between the pin plates of one connecting link, a knockout pin device comprising a longitudinally extending frame having an upper surface, a ram mounting block joined to one longitudinal end portion of said frame, a ramrod mounted for longitudinal reciprocal movement by said ram block between an extended position and a retracted datum position, a plunger block slidable on said upper surface connected to one end portion of said ramrod to move therewith a pair of parallel, transversely spaced, longitudinally elongated plungers each having one end portion mounted by said plunger block at an elevation above said upper surface and extending away from said plunger block in a direction opposite the ramrod, said frame having a transverse slot opening through said upper surface, and a cradle mounted in said slot, said cradle having at least three upwardly extending transverse spaced projections in transverse alignment and an upwardly opening notch between each adjacent pair of projections that is generally U-shaped in transverse vertical cross-section, the lowermost surfaces forming said notches being at a higher elevation than said upper surface, two adjacent notches being longitudinally aligned with said plungers and each projection being of a size and shape to be extended between adjacent rollers and the plates connecting said rollers of at least a part of the assembled chain, said plunger block in being moved by the ramrod to its extended position moving the plungers into abutting engagement with the pins of a connecting link on said cradle to force the pins out of the bushings of the roller links that are joined by said roller links.

2. The apparatus of claim 1 further characterized in that said cradle has a web portion integrally joined to said projectiones and is seatable in said slot and an upright, transversely elongated leg integrally joined to said web portion, said leg being longitudinally spaced from said projections and longitudinally between said projections and said plunger block, said leg having a guide aperture for each of said plungers.

3. The apparatus of claim 1 further characterized in that the projection surface portions defining each notch in transverse cross-section are of size and shape to form a relative close fit with a roller, the lowermost portion of each notch being at a higher elevation than said upper surface.

4. The apparatus of claim 1 further characterized in the end portions of the plungers opposite the plunger block are of substantially the same diameters.

5. The apparatus of claim 1 further characterized in that said frame has parallel, transversely extending vertical surface portions and a horizontal surface portion defining said slot and that said cradle has a horizontal lower surface in abutting relationship with said horizontal surface portion and a vertical surface portion in abutting relationship with the vertical surface portion remote from the ram block.

6. The apparatus of claim 5 further characterized in that said cradle is removably mounted in said slot by a single bolt threaded into the frame.

7. For disassembling a roller chain having alternating roller links and connecting links, each roller link having a pair of roller plates, a pair of rollers between said roller plates, and a bushing in each roller, and each connecting link having a pair of pins and pin plates press fitted on opposite end portions of said pins, said pins respectively being extended through the bushings of adjacent roller links and the roller plates of adjacent roller links extending between the pin plates of one connecting link, a knockout pin device comprising a longitudinally extending frame having an upper surface, a ram mounting block joined to one longitudinal end portion of said frame, a ramrod mounted for longitudinal reciprocal movement by said ram block between an extended position and a retracted datum position, a plunger member slidable on said upper surface connected to one end portion of said ramrod to move therewith, a pair of parallel, transversely spaced, longitudinally elongated plungers each having one end portion mounted by said plunger member at an elevation above said upper surface and extending away from said plunger member in a direction opposite the ramrod, a cradle, first means for attaching the cradle to the frame, said cradle having at least three upwardly extending transverse spaced projections in transverse alignment and an upwardly opening notch between each adjacent pair of projections that is generally U-shaped in transverse vertical cross-section, the lowermost surfaces forming said notches being at a higher elevation than said upper surface, two adjacent notches being longitudinally aligned with said plungers and each projection being of a size and shape to be extended between adjacent rollers and the plates connecting said rollers of at least a part of the assembled chain, said plunger member in being moved by the ramrod to its extended position moving the plungers into abutting engagement with the pins of a connecting link on said cradle to force the pins out of the bushings of the roller links that are joined by said roller links.

8. The apparatus of claim 7 further characterized in that said frame has a transverse slot opening through said upper surface, said cradle having a web portion integrally joined to said projections and seatable in said slot, and that the attaching means comprises a bolt threaded into said frame.

9. The apparatus of claim 7 fruther characterized in that the first means camprises a backup plate, a spacer between the backup plate and cradle, second means between the cradle and frame for retaining the cradle spaced from the frame, and means for mountingly attaching the backup plate, spacer, cradle and second means to the frame in the above mentioned relationship, said backup plate having a pair of threaded apertures longitudinally aligned with the plungers, and a sleeve threaded into each aperture, each sleeve having an opening longitudinally aligned with a plunger that is of a larger diameter than the pin and a smaller diameter than the outside diameter of the roller.

10. The apparatus of claim 7 further characterized in that said first means includes second means for retaining the cradle horizontally spaced from the frame, said second means including a guide plate having spaced guide apertures for the plungers to extend into, and third means for attaching said cradle and second means to the frame with the guide plate horizontally intermediate the cradle and the plunger member.

11. The apparatus of claim 10 further characterized in that the first means includes a backup plate horizontally spaced from the cradle on the opposite side of the cradle from the guide plate, and fourth means for mounting the backup plate spaced from the cradle and attaching the backup plate, guide plate and cradle to the frame, said backup plate having a pair of internally threaded apertures horizontally aligned with the plungers, and that there is provided a sleeve threaded into each aperture, each sleeve having an opening therethrough longitudinally aligned with the respective plunger of an inside diameter less than the outer diameter of the bushings and a greater inside diameter than the pin.

12. The apparatus of claim 11 further characterized in that said plunger member comprises a plunger block slidable on said upper surface and connected to said ramrod, an end plate having horizontal spaced bores therethrough, each bore having an enlarged diameter bore portion, and a cap screw extended through each bore and threaded into the plunger block for retaining the end plate in a fixed position relative the plunger block, each cap screw having a head portion, the diameter of a bore portion being substantially larger than the corresponding dimension of the head portion.

References Cited

UNITED STATES PATENTS

| | | | |
|---|---|---|---|
| 2,700,870 | 2/1955 | Green | 59—7 |
| 3,003,306 | 10/1961 | Quisenberry | 59—7 |
| 3,058,295 | 10/1962 | Temple et al. | 59—7 |
| 3,075,346 | 1/1963 | Quarve et al. | 59—7 |
| 3,075,347 | 1/1963 | Bonifas et al. | 59—7 |
| 3,172,250 | 3/1965 | Eastep | 59—7 |

CHARLES W. LANHAM, Primary Examiner

G. P. CROSBY, Assistant Examiner

U.S. Cl. X.R.

59—11